US010871934B2

(12) United States Patent
Paulovich et al.

(10) Patent No.: US 10,871,934 B2
(45) Date of Patent: Dec. 22, 2020

(54) VIRTUAL CONTENT DISPLAYED WITH SHARED ANCHOR

(71) Applicant: Microsoft Technology Licensing, LLC, Redmond, WA (US)

(72) Inventors: Jonathan Gustav Paulovich, Redmond, WA (US); John Copic, Redmond, WA (US); Karim Audrey Luccin, Redmond, WA (US); Haley Nicole Eisenshtadt, Farmington Hills, MI (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 150 days.

(21) Appl. No.: 15/586,721

(22) Filed: May 4, 2017

(65) Prior Publication Data

US 2018/0321894 A1    Nov. 8, 2018

(51) Int. Cl.
*G06F 3/14* (2006.01)
*G06T 19/00* (2011.01)
(Continued)

(52) U.S. Cl.
CPC ......... *G06F 3/1454* (2013.01); *G02B 27/017* (2013.01); *G02B 27/0172* (2013.01);
(Continued)

(58) Field of Classification Search
CPC ...... G06F 3/1454; G06F 3/012; G06F 3/1423; G06F 3/013; G02B 27/0172;
(Continued)

(56) References Cited

U.S. PATENT DOCUMENTS 6,542,083 B1    4/2003  Richley et al.
7,231,063 B2    6/2007  Naimark et al.
(Continued)

FOREIGN PATENT DOCUMENTS

WO    2015176163 A1    11/2015

OTHER PUBLICATIONS

Harle, et al. "Cluster Tagging: Robust Fiducial Tracking for Smart Environments", in Proceedings of International Symposium on Location-and Context-Awareness, May 10, 2006, 4 pages.
(Continued)

*Primary Examiner* — Nasim N Nirjhar
(74) *Attorney, Agent, or Firm* — Alleman Hall Creasman & Tuttle LLP

(57) ABSTRACT

Methods, computing devices and display devices are disclosed for displaying virtual content at a target location that is determined relative to a shared anchor. Image data of a physical environment may be captured. A shared anchor tag may be identified in the image data. Based on identifying the shared anchor tag, shared anchor tag image data may be transmitted to a server. Based at least on data retrieved by the server, a data packet comprising a shared anchor associated with a second display device is received, wherein the shared anchor defines a three-dimensional location in the physical environment. A hologram is displayed at a target location determined relative to the location of the shared anchor.

15 Claims, 10 Drawing Sheets

(51) Int. Cl.
*G06F 3/01* (2006.01)
*G03H 1/22* (2006.01)
*G02B 27/01* (2006.01)
*G06F 3/0481* (2013.01)

(52) U.S. Cl.
CPC .......... *G03H 1/2249* (2013.01); *G06F 3/012* (2013.01); *G06F 3/04815* (2013.01); *G06F 3/1423* (2013.01); *G06T 19/006* (2013.01); *G02B 2027/0138* (2013.01); *G02B 2027/0141* (2013.01); *G02B 2027/0174* (2013.01); *G03H 2001/2252* (2013.01); *G03H 2226/02* (2013.01); *G03H 2226/04* (2013.01); *G03H 2226/05* (2013.01); *G06F 3/013* (2013.01)

(58) Field of Classification Search
CPC ......... G02B 2027/0174; G03H 1/2249; G03H 2226/04; G03H 2226/02; G03H 2001/2252; G03H 2226/05; G06T 19/006
See application file for complete search history.

(56) References Cited

U.S. PATENT DOCUMENTS

| | | |
|---|---|---|
| 7,538,724 B1 | 5/2009 | Baillot |
| 8,434,674 B2 | 5/2013 | Mangione-Smith |
| 2006/0227998 A1 | 10/2006 | Hobgood et al. |
| 2013/0083018 A1 | 4/2013 | Geisner et al. |
| 2013/0137076 A1 | 5/2013 | Perez et al. |
| 2013/0167208 A1* | 6/2013 | Shi ............... H04L 63/18 726/5 |
| 2013/0342570 A1* | 12/2013 | Kinnebrew ......... G09G 3/003 345/633 |
| 2014/0156319 A1* | 6/2014 | Deeb ................. G06Q 30/06 705/5 |
| 2014/0157206 A1 | 6/2014 | Ovsiannikov et al. |
| 2016/0045279 A1 | 2/2016 | Daon et al. |
| 2016/0071319 A1 | 3/2016 | Fallon et al. |
| 2016/0087693 A1* | 3/2016 | Shimomura et al. ... A63F 13/34 340/10.1 |
| 2017/0061700 A1 | 3/2017 | Urbach et al. |
| 2018/0033208 A1* | 2/2018 | Martin ............... G06T 19/006 |
| 2018/0158243 A1* | 6/2018 | Gleason .............. G06T 19/006 |

OTHER PUBLICATIONS

Rekimoto, et al. "CyberCode: designing augmented reality environments with visual tags", in Proceedings of DARE on Designing augmented reality environments, Apr. 1, 2000, pp. 1-10.

"AprilTags Visual Fiducial System", https://april.eecs.umich.edu/wiki/AprilTags, Retrieved Date: Oct. 3, 2016, 2 pages.

Noor, Ahmed K., "The HoloLens Revolution", in Mechanical Engineering Magazine Select Articles 138, No. 10, Oct. 1, 2016, pp. 30-35.

"International Search Report and Written Opinion Issued in PCT Application No. PCT/US2018/028465", dated Aug. 9, 2018, 12 Pages.

* cited by examiner

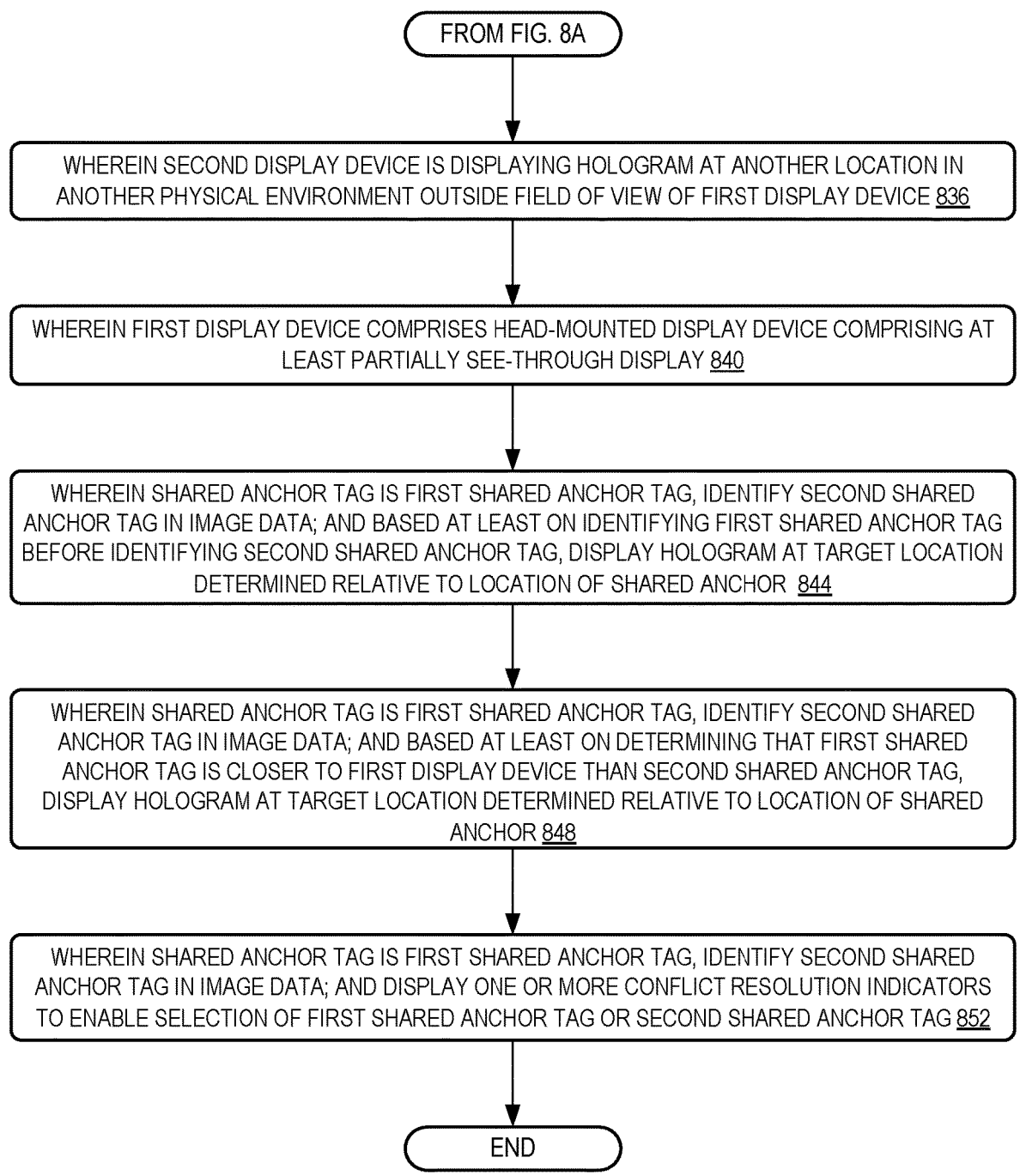

VIRTUAL CONTENT DISPLAYED WITH SHARED ANCHOR

BACKGROUND

Augmented reality and virtual reality display devices may share virtual content. Where multiple users and devices are in a common location, sharing the proper virtual content with a user can prove challenging.

SUMMARY

Methods, computing devices and head-mounted display devices are provided for displaying virtual content at a target location that is determined relative to the location of a shared anchor. For example, image data of a physical environment may be captured. A shared anchor tag in the image data may be identified, and shared anchor tag image data may be transmitted to a server computing device. Based at least on data retrieved by the server computing device using the shared anchor tag, a data packet comprising a shared anchor that is associated with a second display device may be received, wherein the shared anchor defines a three-dimensional location in the physical environment. A hologram may be displayed at a target location that is determined relative to the location of the shared anchor.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 8A and 8B are a flow chart of a method of displaying a hologram at a target location determined relative to a shared anchor location according to an example of the present description.

DETAILED DESCRIPTION

Some technologies enable users to experience a partially virtual or fully virtual world. For example, augmented reality head-mounted display (HMD) devices may include a partially transparent display that blends a user's view of the real world with displayed virtual objects and other content. Virtual reality HMD devices may display a fully-immersive, entirely virtual environment with no view of the real world. Other display devices, such as laptops, smartphones, etc., also may display virtual content in the context of a displayed image of the device's real world surroundings.

In some cases, a user may desire to view virtual content, such as one or more holograms, that is also being viewed by one or more other users via other devices. However, sharing the desired virtual content with a particular user in an efficient and effective manner can prove challenging. For example, where multiple users and devices are in the same room or other space, different users may be viewing different holograms located in various locations. A new user desiring to view a particular hologram at a particular location may find it challenging to easily acquire the proper image data and related location information to properly view the desired hologram.

The present descriptions relate to virtual content that is displayed by multiple devices relative to the same shared anchor. In some examples, one user's display device may display a hologram at a target location that is determined relative a shared anchor associated with the user's device. As described in more detail below, a second user's device may capture image data of a shared anchor tag that identifies the shared anchor. Using this image data, the second user's device may receive the shared anchor and may use it to display the same hologram at the same target location.

In some examples, the display device may comprise an HMD device, such as an augmented reality display device that includes an at least partially see-through display configured to visually augment a view of a real world three dimensional environment through the display. In other examples, the HMD device may comprise a fully-immersive virtual reality display device. In other examples, the display device may comprise a tablet computer, smartphone, or other mobile computing device capable of visually augmenting a user's view of a real world three dimensional environment via the display.

Figure 1:
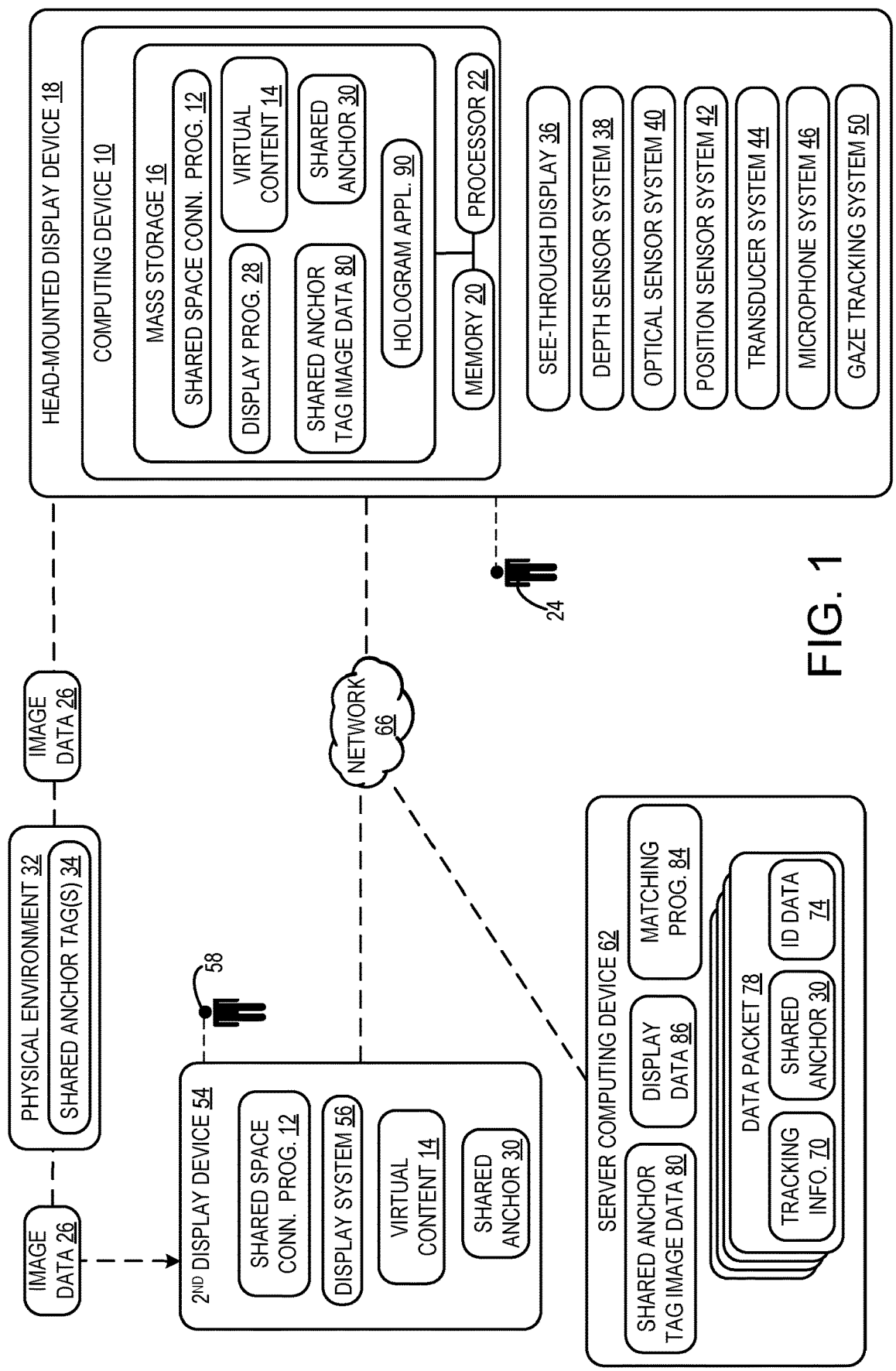
FIG. 1 is a schematic view of a head-mounted display device, second display device and server computing device according to examples of the present description.

With reference now to FIG. 1, a schematic view of example implementations of computing and display devices for displaying virtual content at a target location determined relative to a shared anchor is provided. In one example a computing device 10 is integrated into a head-mounted display (HMD) device 18. Computing device 10 may include a shared space connection program 12 comprising instructions that may be stored in mass storage 16. The shared space connection program 12 may be loaded into memory 20 and executed by a processor 22 to perform one or more of the methods and processes described herein. Additional details regarding the components and computing aspects of the computing device 10 are described in more detail below with reference to FIG. 9.

The HMD device 18 may create and display to a first viewer 24 an augmented reality environment comprising virtual content 14. The HMD device 18 may include a display program 28 that generates such virtual content 14 for display via the HMD device. The virtual content 14 may include one or more three-dimensional (3D) holograms and two-dimensional (2D) virtual images that are generated and displayed to appear located within a real world physical environment 32 viewed through the device. In this manner, the HMD device 18 may create an augmented reality environment that enables the viewer to perceive such virtual content 14 as positioned within the physical environment 32 surrounding the viewer. Additionally and as described in more detail below, the HMD device 18 may display the virtual content 14 at a target location that is determined relative to the location of a shared anchor 30.

As used herein, a hologram is an image formed by displaying left and right images on respective left and right near-eye displays, and that appears to be positioned at a distance from the user via stereoscopic effects. In some examples, holograms are anchored to a map of the physical environment 32 by one or more virtual anchors, which are placed within the map according to their coordinates. Such anchors are fixed relative to real world objects in the physical environment (e.g., world-locked). Holograms and other virtual content may be configured to be displayed in a location that is computed relative to the anchor. The anchors may be placed in any location, and in some examples are placed at locations where features exist that are recognizable via machine vision techniques. In some examples a hologram may be positioned within a predetermined distance from a corresponding anchor, such as within 3 meters in one particular example.

In some examples the HMD device 18 may comprise an at least partially see-through display 36 that is supported in front of a user's eye or eyes, thereby giving the user a view of his or her surroundings. Any suitable display technology and configuration may be used to display images via the at least partially see-through display 36. For example, the at least partially see-through display 36 may be configured to enable a wearer of the HMD device 18 to view a physical, real-world object in the physical environment through one or more partially transparent pixels that are displaying a virtual object representation. The at least partially see-through display 36 may include image-producing elements such as, for example, a see-through Organic Light-Emitting Diode (OLED) display.

As another example, the HMD device 18 may include a light modulator on an edge of one or more at least partially see-through display panels. In this example, the panel(s) may serve as a light guide for delivering light from the light modulator to the eyes of a wearer. Such a light guide may enable a wearer to perceive virtual content located within the physical environment that the wearer is viewing. In other examples the display panels may utilize a liquid crystal on silicon (LCOS) display.

The HMD device 18 may include one or more sensors and related systems that receive physical environment data from the physical environment 32. For example, the HMD device 18 may include a depth sensor system 38 that generates depth image data. The depth sensor system 38 may include one or more depth cameras that capture image data 26 from the physical environment 32. In some examples the depth camera(s) may be an infrared time-of-flight depth camera. In other examples the depth camera(s) may take the form of a structured light depth camera. Any suitable depth tracking system and technology may be utilized.

In some examples the HMD device 18 may include an optical sensor system 40 that utilizes at least one outward facing sensor, such as an RGB camera, IR sensor or other optical sensor. The outward facing sensor may capture image data 26 in the form of color, IR or other light information from the physical environment 32. In some examples such image data 26 may be used by the processor 22 to detect movements within a field of view of the HMD device 18, such as gesture-based inputs or other movements performed by a wearer (e.g., a pinching of fingers, pointing with a finger, etc.) that indicate an action to be taken, a selection of a virtual object displayed via the HMD device 18, or other user input. In some examples and as described in more detail below, such image data 26 may be used to identify one or more shared anchor tags 34 in the physical environment 32.

Data from the optical sensor system 40 also may be used by the processor 22 to determine direction/location and orientation data (e.g., from imaging environmental features) that enables position/motion tracking of the HMD device 18 relative to the real world physical environment 32. The HMD device 18 may also include a position sensor system 42 comprising one or more accelerometers, gyroscopes, inertial measurement units, head tracking systems, and/or other sensors for determining a position and/or orientation of the device. The relative position and/or orientation of the HMD device 18 relative to the physical environment 32 may be assessed so that virtual content may be accurately displayed in desired real-world locations with desired orientations.

In some examples, data captured by the depth sensor system 38, optical sensor system 40, and position sensor system 42 may be used to perform simultaneous location and mapping (SLAM) within the physical environment 32. In this manner, a map of the physical environment 32 including a mesh of reconstructed surfaces may be generated, and the HMD device 18 may be located within the map of the physical environment. In some examples, a 3D model of at least a portion of the physical environment 32 may be generated by HMD device 18 and utilized to display and manipulate virtual content 14 within the physical environment 32. The 3D model may include surface reconstruction information that may be used to identify physical objects and features in the physical environment 32.

In some examples, a 6 degree-of-freedom (6DOF) position sensor system may be used to display virtual content in a world-locked manner. A world-locked virtual object, such as a hologram, appears to be fixed relative to real world objects viewable through the HMD device 18, thereby enabling a wearer of the HMD device to move around a real world physical environment while perceiving the virtual object as remaining stationary in a fixed location and orientation in the physical environment.

In other examples, the HMD device 18 may operate in a body-lock display mode in which one or more virtual objects may be displayed via the HMD device with body-locked positions. In a body-locked position, a holographic object appears to be fixed relative to the wearer of the HMD device 18, and the body-locked position of the holographic object appears to be moveable relative to real-world objects.

The HMD device 18 may also include a transducer system 44 comprising one or more actuators that convert an electrical signal into another form of energy. In some examples, the transducer system 44 may include one or more speakers for providing audio feedback to a viewer. In other examples the transducer system 44 may include one or more tactile transducers for generating and providing haptic feedback to the viewer, such as vibrations. The HMD device 18 may also include a microphone system 46 and one or more microphones for receiving audio input from the physical environment.

Computing device 10 may receive gaze tracking data from a gaze tracking system 50 of the HMD device 18. In some examples, one or more inward-facing light sources and image sensors may collect image information that is used to measure gaze parameters of the user's eyes. Using this information, the processor 22 may execute instructions to determine a direction in which the user is gazing and/or an identity of a physical and/or virtual object at which the user is gazing. In other examples, any suitable gaze tracking technology may be utilized.

The example illustrated in FIG. 1 shows the computing device 10 integrated into the HMD device 18. It will be appreciated that in other examples the computing device 10 may be a separate component from the HMD device 18 that is communicatively coupled to the device using a wired or wireless connection, such as WiFi, Bluetooth, or any other suitable wireless communication protocol. Additionally, many types and configurations of HMD devices 18 having various form factors may be used and are within the scope of the present disclosure. In some examples, one or more of the above-described sensor systems or other data gathering systems may be located externally to the HMD device 18, such as in a set-top box, gaming console, or other like device that does not include an integrated display.

FIG. 1 also shows a second display device 54 comprising a display system 56 that may display to another user 58 the same virtual content 14 relative to the same shared anchor 30. As with HMD device 18, second display device 54 may include a computing device and a shared space connection program 12, and may capture image data 26 from the physical environment 32. In some examples, the second display device 54 may include one or more of the sensor, transducer, microphone and gaze tracking systems of the HMD device 18 described above.

In some examples, the second display device 54 may comprise a non-see-through head-mounted display device that provides an immersive, virtual reality experience. In these examples, displaying a virtual object within a real world physical environment may comprise displaying the virtual object within a virtual representation of the physical environment 32, where virtual surfaces correspond to physical surfaces.

As described in more detail below, in some examples both the HMD device 18 and the second display device 54 may display the same virtual content 14 at the same 3D location in the physical environment 32, with such location being defined relative to the location of shared anchor 30. In these examples, both devices may operate with a common understanding of their positions relative to the physical environment 32 and each other. With this common spatial understanding, the devices may interact with each other and the physical environment, enabling scenarios such as sharing of holograms positioned in the world. In this manner, both users 24 and 58 may see the same world-locked hologram appear at the same location and in the same orientation in the physical environment 32.

As noted above, the devices may use 6DOF tracking systems to create 3D maps of the physical environment 32. To enable a mutual spatial understanding around a point of interest (e.g., a shared hologram), in some examples the devices may share a common 3D map of their surrounding environment or portions of the environment. For example, the HMD device 18 may share with the second display device 54, either directly or via network 66, a relevant subset of the 3D map that includes the HMD device's surroundings. In this manner, the two devices may operate based on common positions.

The type of map data utilized in the present disclosure is not limited, and will be understood to be any set of data that correlates points in a 3D coordinate space in the physical environment 32 to information that helps orient and locate the display device in the 3D space. Similarly, the format of the shared anchor 30 data is not particularly limited. For example, the shared anchor 30 may be encoded as unique string identifiers the identify the anchor and coordinates that identify the position of the anchor within the map.

In some examples, and as described in the use case examples below, the HMD 18 may display virtual content 14 at a target 3D location in the physical environment 32 relative to the location of shared anchor 30. HMD 18 may collect or generate tracking information, such as map data, orientation data, position data, etc., that describes the device's position relative to its surrounding physical environment 32 and the shared anchor 30.

Where user 58 of the second display device 54 desires to view the same virtual content 14 at the same target 3D location as viewed by the first user 24, the second display device may utilize the location of shared anchor 30 along with tracking information describing the device's position in the physical environment 32 relative to the shared anchor. In this manner, the second display device 54 may display the virtual content 14 to second user 58 at the same target 3D location. Additionally, and as the second display device 54 is located at a different location in the physical environment 32 as compared to the HMD device 18, the second display device displays the virtual content to the second user 58 from the second user's vantage point, thereby providing a view of the content that is different from the view of the first user 24.

As noted above, in some examples where multiple users and devices are in a common location, sharing the proper virtual content with a particular user/device can prove challenging. Accordingly and with reference again to FIG. 1, to facilitate such shared viewing of virtual content, the HMD device 18 and second display device 54 may be communicatively coupled to a server computing device 62 via a network 66. The network 66 may take the form of a local area network (LAN), wide area network (WAN), wired network, wireless network, personal area network, or a combination thereof, and may include the Internet. In other examples, one or more additional display devices may be communicatively coupled to server computing device 62 via network 66.

In different examples, server computing device 62 may take the form of a server, networking computer, gaming console, mobile communication device, desktop computer, laptop computer, tablet computer, set-top box (e.g. cable television box, satellite television box), or any other type of suitable computing device. Additional details regarding the components and computing aspects of server computing device 62 are described in more detail below with respect to FIG. 9.

As described in more detail below, in some examples the server computing device 62 may receive tracking information 70 and one or more shared anchors 30 from multiple display devices, such as HMD device 18 and second display device 54. For each instance of tracking information 70 and shared anchor 30 it receives, the server computing device 62 may store such information and anchor(s) with identification data 74 that associates the anchor(s) and information with the display device from which it was received. For example, second display device 54 may programmatically generate a shared anchor 30 and may use such anchor to display virtual content 14 to second user 58. In some examples, tracking information 70, shared anchor(s) 30 and identification data 74 of the corresponding display device may be stored in data packets 78.

As described in the use case examples provided below, HMD device 18 may identify a shared anchor tag 34 in captured image data 26 and transmit shared anchor tag image data 80 to server computing device 62. In some examples, identifying the shared anchor tag 34 may trigger the transmission of the shared anchor tag image data 80. In other examples, shared anchor tag image data 80 may be sent to server computing device 62 without requiring a triggering event. As described in more detail below, server computing device 62 may use a matching program 84 to match the shared anchor tag image data 80 to identification data 74 that corresponds to another display device and is associated with a data packet 78.

The identification data 74 is used to identify and retrieve the corresponding data packet 78 containing a shared anchor 30 and tracking information 70 associated with the other display device. The server computing device 62 may send the data packet 78 to HMD device 18. Using the shared anchor 30 from data packet 78, the HMD device 18 may display the virtual content 14 at the target location determined relative the shared anchor location. In some examples, server computing device 62 also may send to HMD device 18 display data 86 comprising the virtual content 14.

Figure 2:
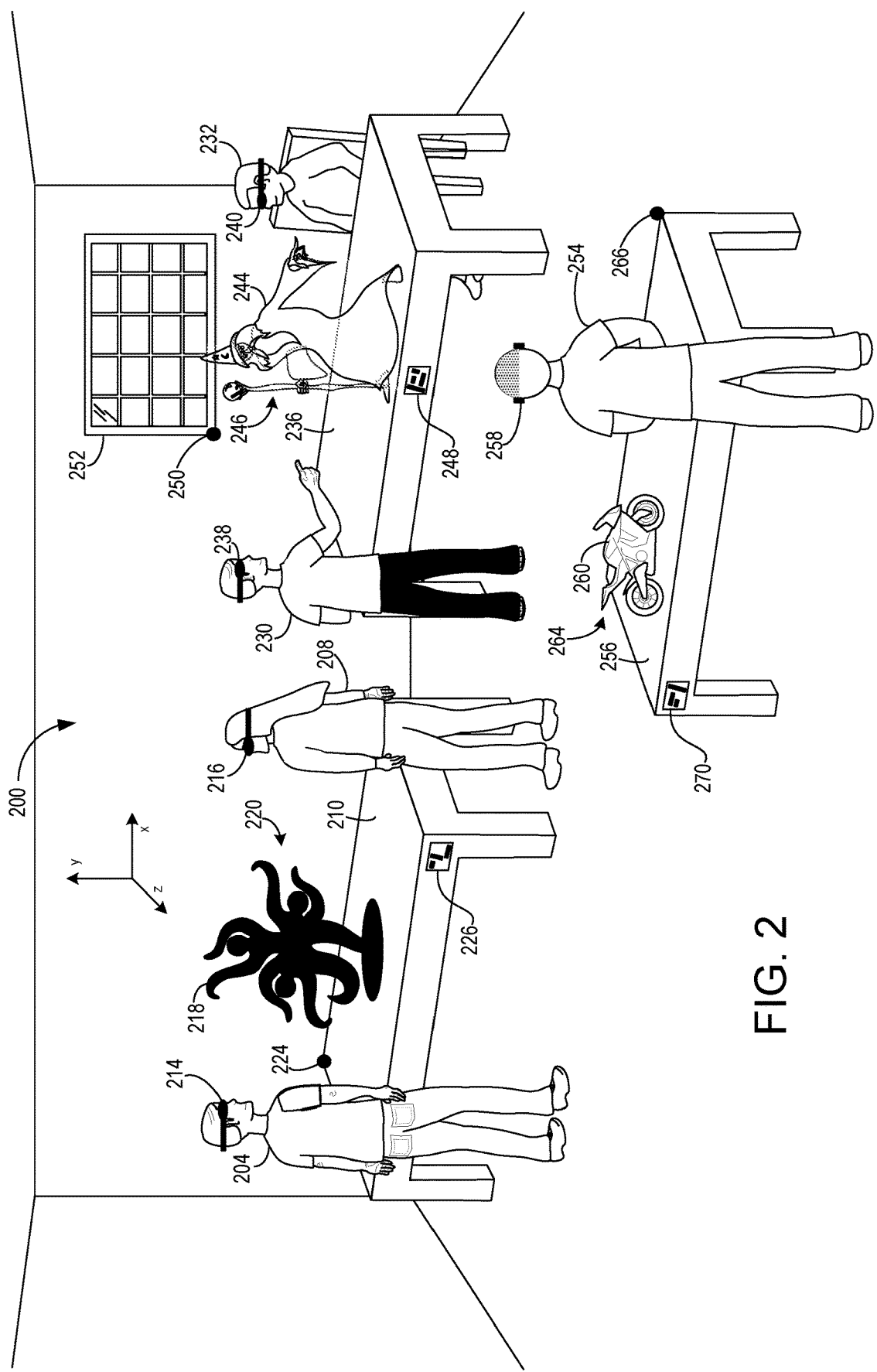
FIG. 2 shows a room with users wearing head-mounted display devices of FIG. 1 displaying different holograms according to examples of the present description.

With reference now to FIGS. 2-7, example use cases illustrating aspects of the present disclosure will now be presented. The example of FIG. 2 shows a room 200 of a game development company in which several developers are working on different holograms for an augmented reality game. In this example developers Eddie 204 and Carrie 208 are standing at Carrie's desk 210 and are wearing HMD devices 214 and 216, respectively, which may take the form of HMD device 18. Carrie's HMD device 216 is displaying to Carrie 208 a sculpture hologram 218 at a target location 220 on Carrie's desk 210. In this example, the target location 220 is established by Carrie's HMD device 216 relative to a virtual shared anchor 224 that is located at one corner of Carrie's table 210. The shared anchor 224 may not be displayed by Carrie's HMD device 216.

In some examples, the location of the virtual shared anchor 224 may be world-locked to a position that is fixed in a 3D coordinate space overlaid upon the real world 3D environment of room 200. In the example of FIG. 2, such a fixed position may be established relative to a 3D coordinate space represented by x-y-z axes. In some examples, a shared anchor may include its own coordinate system, such as an x-y-z axis having an origin at the shared anchor. In some examples, the coordinate system of a shared anchor may adjust as needed, relative to other shared anchors, to ensure anchored holograms stay in place as the HMD device discovers more about the physical environment and refines its understanding about surfaces, objects and their relative positions.

In the example of FIG. 2, Carrie may designate the target location 220 of the sculpture hologram 218 via user input, such as one or more gestures. In some examples, Carrie's HMD device 216 may programmatically generate the target location 220. In one example, Carrie's HMD device 216 may be displaying the sculpture hologram 218 in the context of a hologram development application 90 (see FIG. 1) that enables Carrie to manipulate various aspects and features of the sculpture. The hologram development application 90 may be executed locally on Carrie's HMD device 216, or may be executed on another computing device, such as server computing device 62, to which Carrie's HMD device is communicatively coupled.

Carrie's colleague Eddie 204 may desire to join Carrie in viewing and interacting with the sculpture hologram 218. Accordingly, Eddie's HMD device 214 may join the same application session of the hologram development application 90 in which Carrie's HMD device 216 is participating.

As described in more detail below, Eddie's HMD device 214 may utilize the same shared anchor 224 to display the sculpture hologram 218 to Eddie 204 in the same target location 220 as the sculpture is displayed to Carrie. In this manner, Eddie 204 and Carrie 208 may both view the sculpture hologram 218 in the same real world 3D location and in the same position, rotation, scale with respect to Carrie's desk 210 and the room 200 as if the sculpture were a physical object. Additionally and as described in more detail below, to facilitate the sharing of the sculpture hologram 218 with other developers, a shared anchor tag 226 may be located on Carrie's desk 210.

In a similar manner, developers Mike 230 and Jeff 232 are at Jeff's desk 236 and are wearing HMD devices 238 and 240, respectively, which may take the form of HMD device 18. Jeff's HMD device 240 is displaying a wizard hologram 244 at a target location 246 on Jeff's desk 236. This target location 246 is established relative to another virtual shared anchor 250 that is located at a bottom left corner of window 252. Mike's HMD device 238 may utilize the same shared anchor 250 to display the same wizard hologram 244 at the same target location 246 to Mike 230. Additionally and as described in more detail below, to facilitate the sharing of the wizard hologram 244, a different shared anchor tag 248 that is linked to shared anchor 250 and associated with Jeff's HMD device 240 may be located on Jeff's desk 236.

In a similar manner, developer Matt 254 is standing at his desk 256 wearing HMD device 258, which may take the form of HMD device 18. Matt's HMD device 258 is displaying to Matt a motorcycle hologram 260 at a target location 264. This target location 264 is established relative to another virtual shared anchor 266 that is located at a corner of Matt's desk 256. To facilitate the sharing of the motorcycle hologram 260, a different shared anchor tag 270 that is linked to shared anchor 266 and associated with Matt's HMD device 258 may be located on Matt's desk 256.

As described in more detail below, the shared anchor tags enable another user and display device to easily capture image data of the tag, with such image data being conveniently used to retrieve a corresponding shared anchor. In some examples, each of the shared anchor tags 226, 248 and 270 may comprise a unique visual fiducial that is associated with a corresponding shared anchor, such as shared anchors 224, 250 and 266, respectively. As noted above, in some examples a device may capture image data that includes a shared anchor tag. The device may send shared anchor tag image data to server computing device 62. The server computing device 62 may use matching program 84 to match the shared anchor tag image data to identification data that corresponds to another display device and to a shared anchor associated with the other display device.

Each shared anchor tag may be encoded to uniquely identify a particular shared anchor that may be associated with a particular display device and/or user. In this manner, and in one potential advantage of the present disclosure, the shared anchor tag may minimize its information payload to include just identification data for identifying the data packet 78 that includes the corresponding shared anchor. Accordingly, the shared anchor tag may not encode position, orientation or other related information for locating a display device in a 3D environment, which thereby reduces the size of its payload and enables a wide variety of simple fiducial systems to be utilized.

For example, a shared anchor tag may comprise a 2D barcode image having a small information payload, such as 4-12 bits. In some examples, an AprilTag visual fiducial system may be utilized. In other examples, any suitable visual fiducial or other coded marker system may be utilized for the shared anchor tags. In the examples of FIGS. 2-7, the shared anchor tags comprise printed images that are affixed to locations on various surfaces in the room 200. In some examples a shared anchor tag may be displayed via a display device, such as on a monitor, notebook computer, smartphone, etc.

Figure 3:
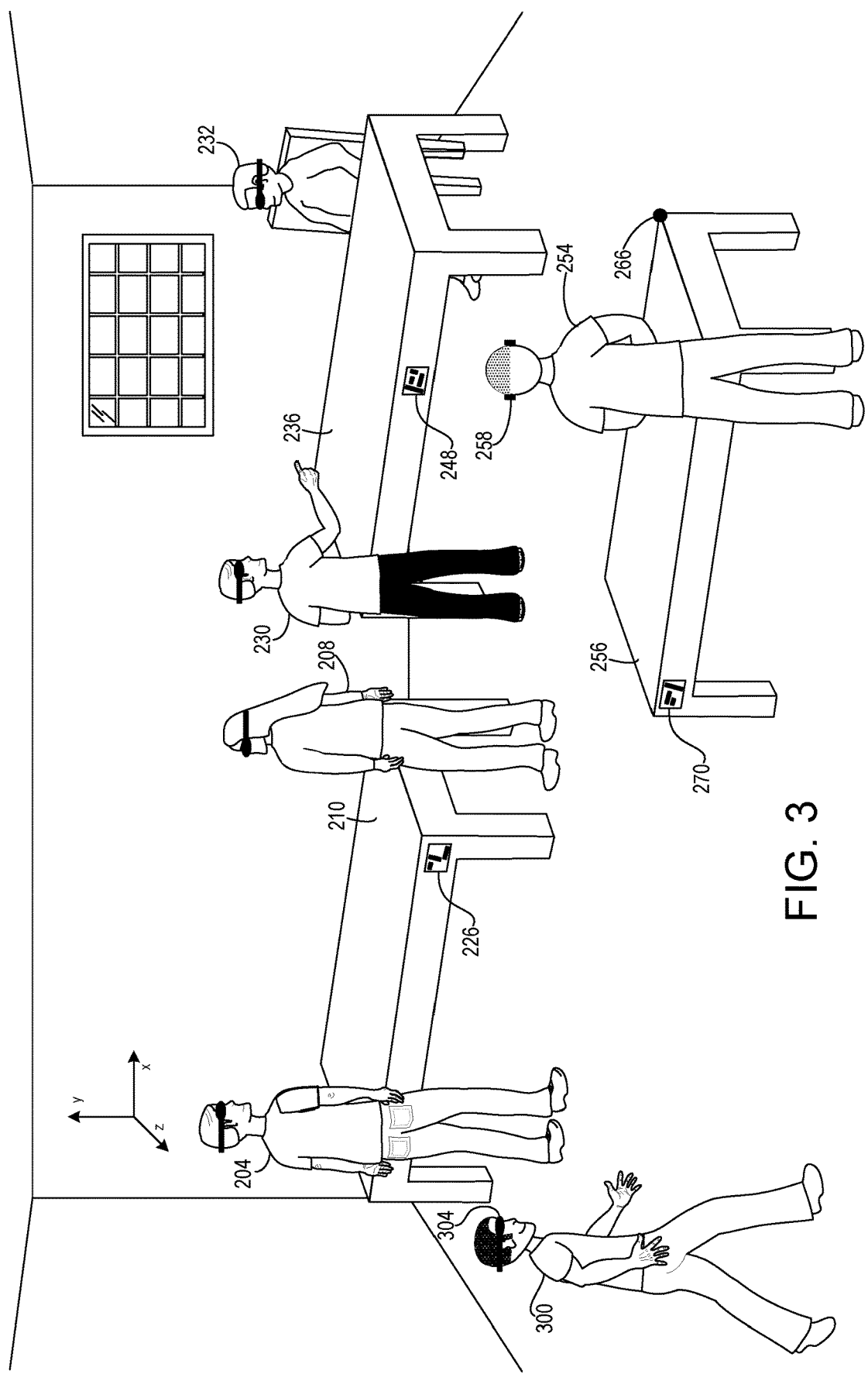
FIG. 3 shows the room of FIG. 2 as seen by a user entering the room wearing a head-mounted display device according to examples of the present description.

With reference now to the example of FIG. 3, another developer Chris 300 may walk into the room 200 wearing an HMD device 304. As illustrated in FIG. 3, initially Chris' HMD device 304 may not display any of the holograms that are being viewed by the other developers in the room via their HMD devices. Thus, FIG. 3 shows an appearance of the room 200 viewed through Chris' HMD device 304 as he enters the room.

As Chris enters the room 300, his HMD device 304 may capture image data from the room. As Chris 300 walks toward Matt's desk 256, Chris' HMD device 304 may use captured image data to identify the shared anchor tag 270 that is associated with Matt's HMD device 258. Based on identifying the shared anchor tag 270, the HMD device 304 may transmit shared anchor tag image data to another computing device, such as server computing device 62.

As noted above, the server computing device 62 may match the shared anchor tag image data to a data packet that comprises shared anchor 266. The server computing device then may send the data packet comprising the shared anchor 266 and tracking information to Chris' HMD device 304. As described above, the tracking information may be used by Chris' HMD device 304 to locate the shared anchor 266 at its 3D location in the room 300. For example, where Chris' HMD device 304 uses a SLAM-based tracking system that analyzes multiple images over multiple frames, the tracking information may include a collection of images showing physical locations around the location of the shared anchor. In other examples where different tracking systems are utilized, different corresponding tracking information (GPS, orientation, compass, etc.) may be included with the shared anchor 266 in the data packet.

Figure 4:
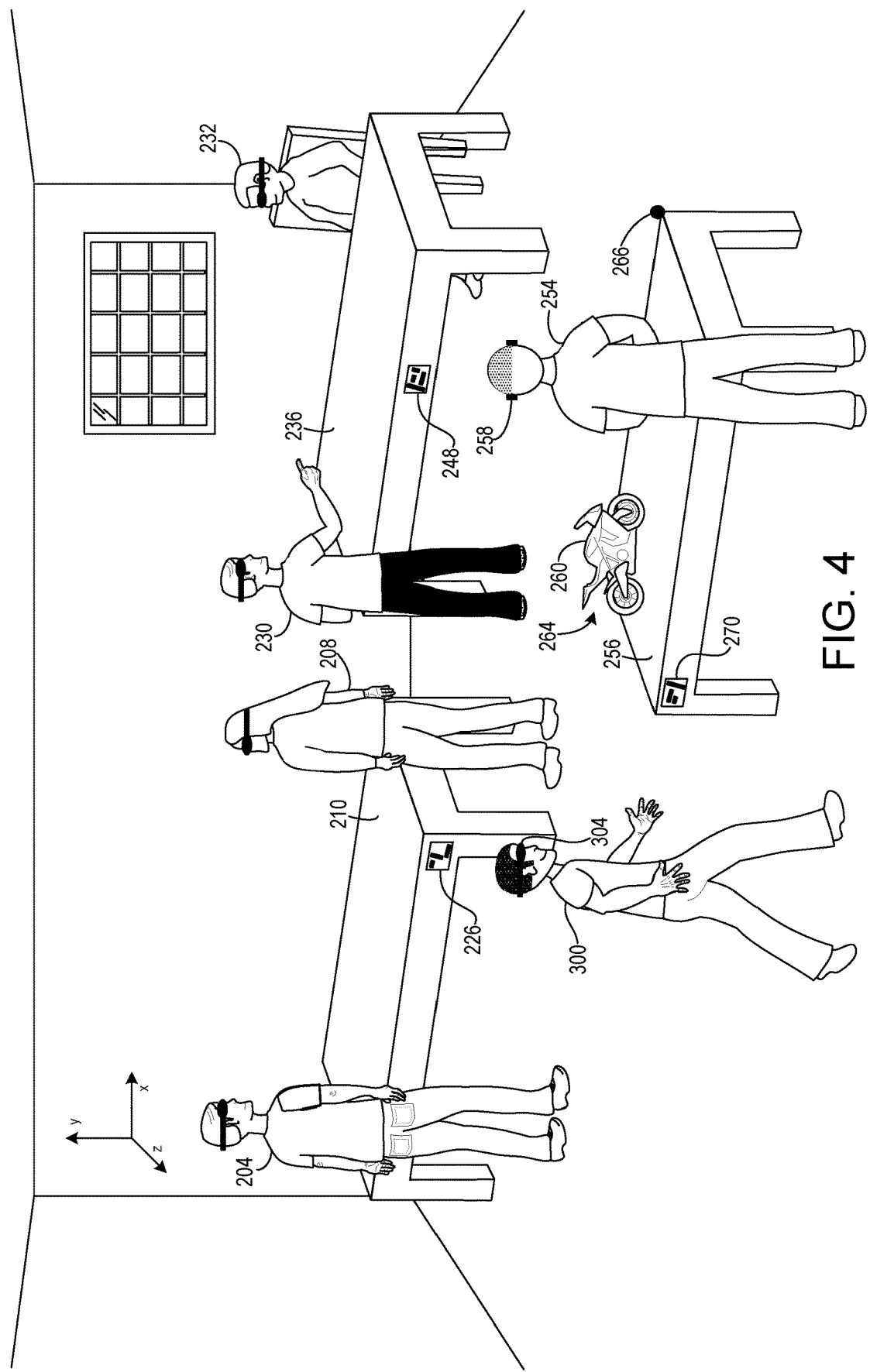
FIG. 4 shows the user approaching a table and viewing a hologram according to examples of the present description.
Figure 5:
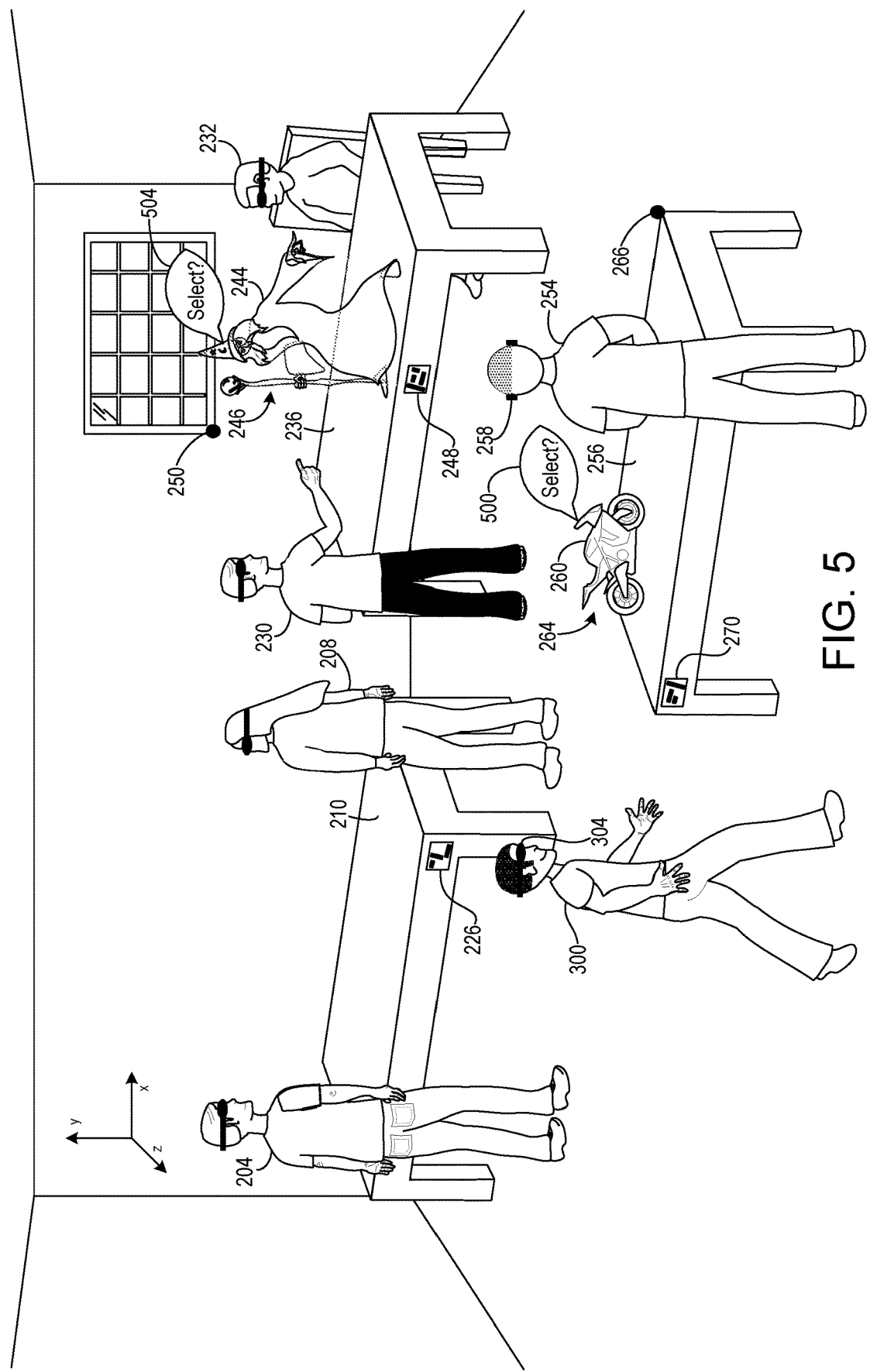
FIG. 5 shows the user viewing two holograms and conflict resolution indicators according to examples of the present description.
Figure 6:
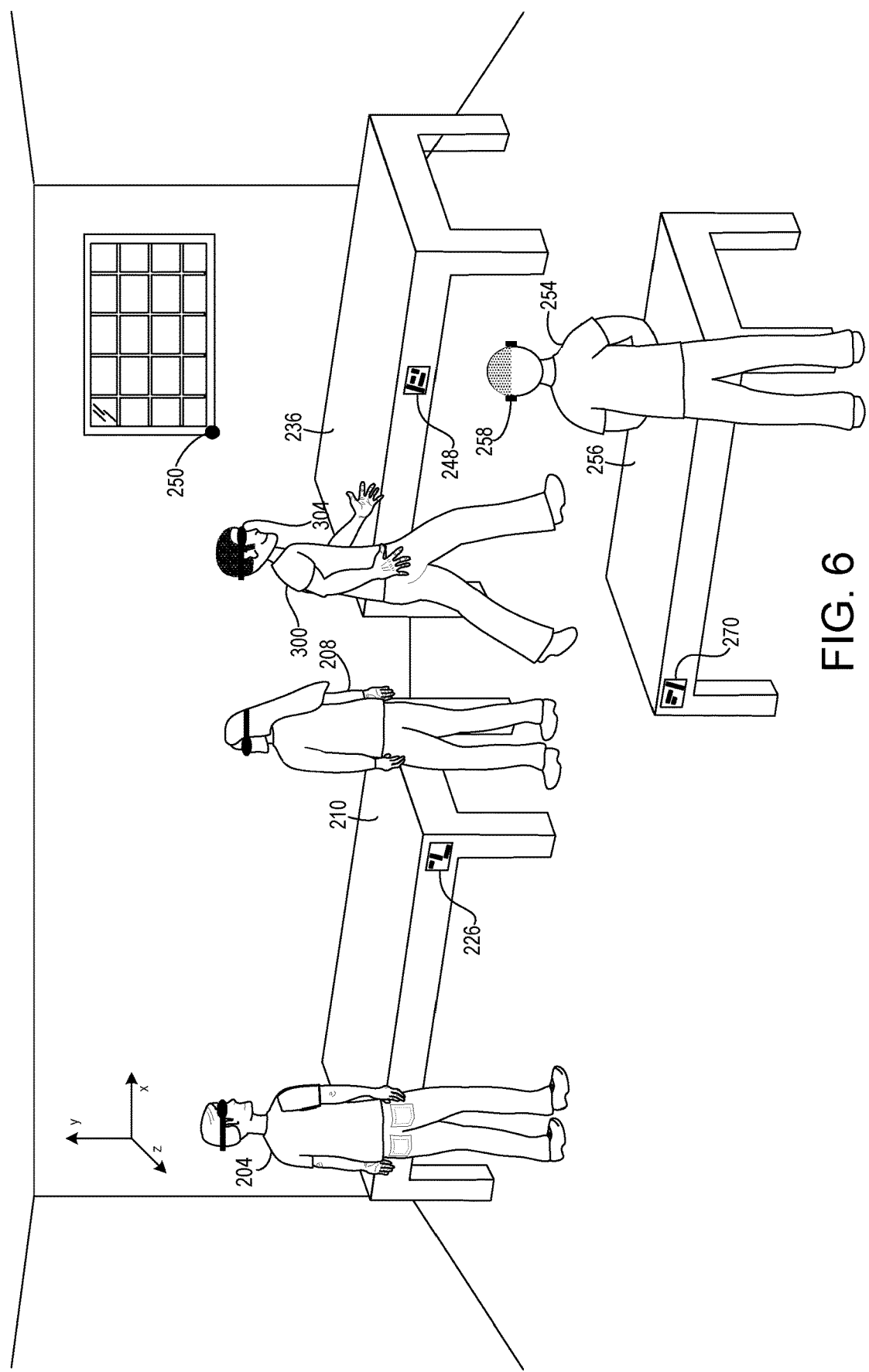
FIG. 6 shows the user approaching a table according to examples of the present description.

With reference now to FIG. 4, by using the shared anchor 266 and corresponding location information, Chris' HMD device 304 may display the motorcycle hologram 260 at the target location 264 relative to the shared anchor 266. In this manner, both Chris and Matt can view and interact with the motorcycle hologram 260 in the same target location 264. Further, both Matt's HMD device 258 and Chris' HMD device 304 may display the motorcycle hologram 260 in a world-locked manner at target location 264. Accordingly, both Matt's HMD device 258 and Chris' HMD device 304 may display the motorcycle hologram 260 in the same 3D orientation relative to the shared anchor 266.

As noted above, in some examples Matt's HMD device 258 may be displaying and interacting with the motorcycle hologram 260 via an application session. In these examples, Chris' HMD device 304 may join the application session so that Chris 300 and Matt 254 may collaboratively interact with the motorcycle hologram 260 via the same application session. In different examples, Chris' HMD device 304 may receive display data for the motorcycle hologram 260 from the server computing device 62, or directly from Matt's HMD device 304, or from both and the server computing device 62 and Matt's HMD device 304.

In some examples, Chris' HMD device 304 may identify two or more shared anchor tags in the image data of room 200. In these examples, different criteria may be analyzed to determine which shared anchor tag to utilize to display virtual content. In some examples, the first shared anchor tag to be identified may be used. For example, as Chris 300 enters the room 200, his HMD device 304 may first identify shared anchor tag 270 at Matt's desk 256, and then identify shared anchor tag 248 at Jeff's desk 236. Based at least on identifying shared anchor tag 270 before identifying shared anchor tag 248, Chris' HMD device 304 may use the earlier-identified shared anchor tag 270 display the motorcycle hologram 260 on Matt's desk 256.

In some examples, the shared anchor tag closest to Chris' HMD device 304 may be used. For example and with reference again to FIG. 4, Chris' HMD device 304 may determine that shared anchor tag 270 on Matt's desk 256 is closer to the device than either shared anchor tag 248 on Jeff's desk 236 or shared anchor tag 226 on Carrie's desk 210. Accordingly, and based at least on determining that shared anchor tag 270 is closer than shared anchor tag 248 and shared anchor tag 226, Chris' HMD device 304 may display the motorcycle hologram 260 relative to shared anchor tag 270 on Matt's desk 256.

In some examples where Chris' HMD device 304 identifies more than one shared anchor tag, it may display one or more conflict resolution indicators to enable Chris to select one of the tags. For example and with reference now to FIG. 5, Chris' HMD device 304 may identify both shared anchor tag 270 and shared anchor tag 248. In response, the device may display both the motorcycle hologram 260 and the wizard hologram 244 along with display selection indicators 500 and 504 with each hologram. By selecting one of the display selection indicators via his HMD device 304, Chris 300 may choose which hologram to interact with.

In other examples where Chris' HMD device 304 identifies more than one shared anchor tag, it may display one or more conflict resolution indicators in the physical space associated with the corresponding shared anchor, and may not display the corresponding hologram. Upon Chris' selection of one of the conflict resolution indicators, the hologram corresponding to the selected shared anchor tag may be displayed.

In other examples, a variety of other indicators and methods for enabling a user to select among multiple shared anchor tags may be used. Such other examples may include, but are not limited to, highlighting, flashing, coloring, or otherwise altering the appearance of the multiple tags, and receive user input that selects one of the tags.

Figure 7:
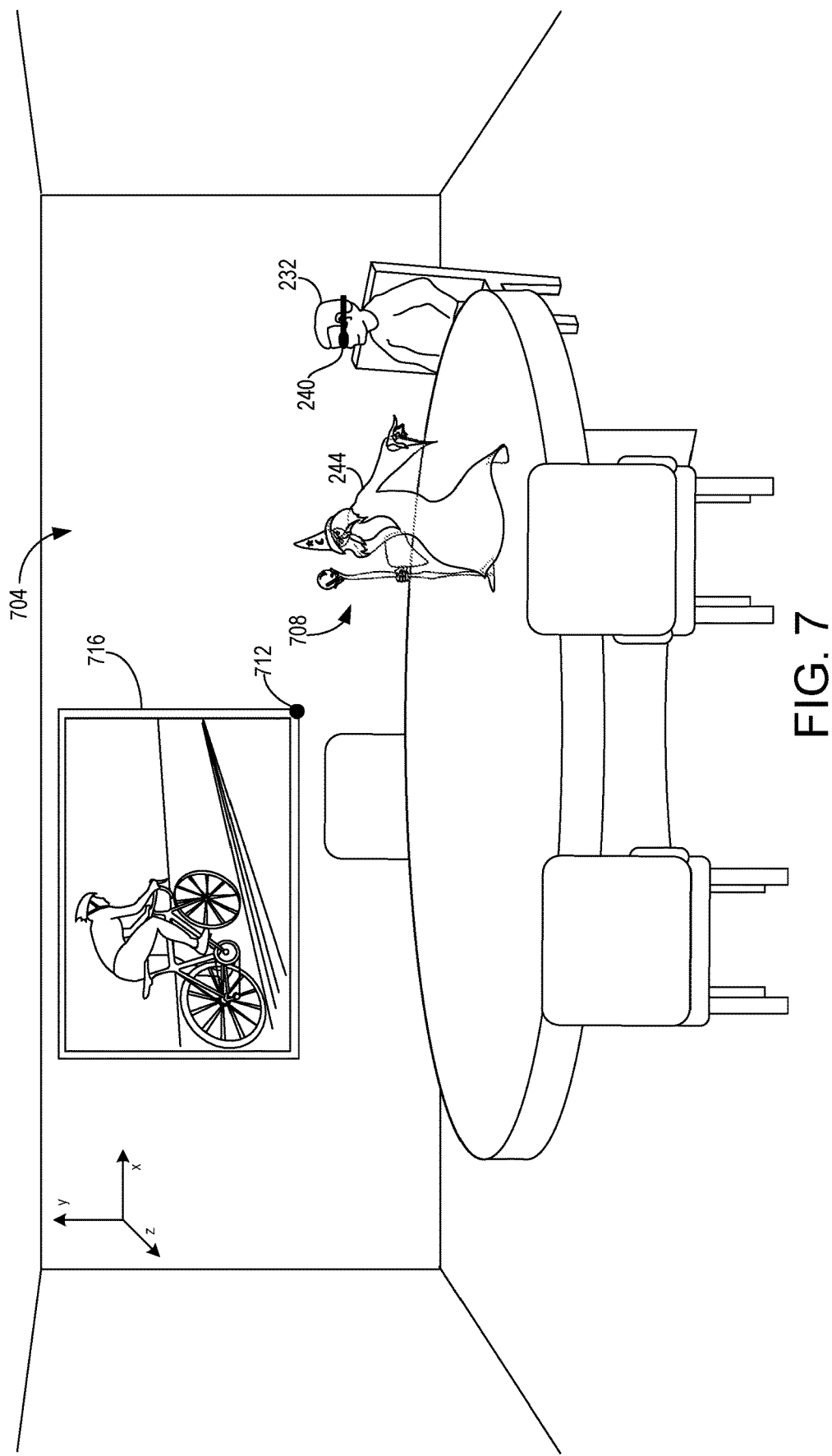
FIG. 7 shows one of the users of FIG. 2 in a different location viewing a hologram according to examples of the present description.

In some examples, a shared anchor tag may be linked to a shared anchor that is located in one location and also is associated with a display device located in another location. In one example and with reference now to FIG. 6, Chris 300 may walk into room 200 when Jeff 232 is away from this desk 236. For example and as shown in FIG. 7, on this day Jeff 232 may be working remotely in another room 704 located in company offices across town. Jeff 232 may be working on his wizard hologram 244 via his HMD device 240 displaying the hologram at a location 708 relative to another shared anchor 712 located on a corner of framed print 716.

As Chris 300 is in room 200, the location 708 of wizard hologram 244 in room 704 is clearly outside a field of view of Chris' HMD device 304. Nevertheless, Chris may desire to join Jeff in interacting with the wizard. In this example, the shared anchor tag 248 at Jeff's desk 236 may be linked to the shared anchor 250 in room 200, and may be associated with Jeff's HMD device 240. In this manner, when Chris' HMD device 304 identifies shared anchor tag 248, the device may receive shared anchor 250 and its related location information, and may receive display data for the wizard hologram 244 that causes the device to display the wizard hologram 244 at location 246 on Jeff's desk 236 (see FIG. 5). As noted above, Chris' HMD device 304 may join the application session in which Jeff's HMD device is displaying and interacting with the wizard hologram 244.

Figure 8A:
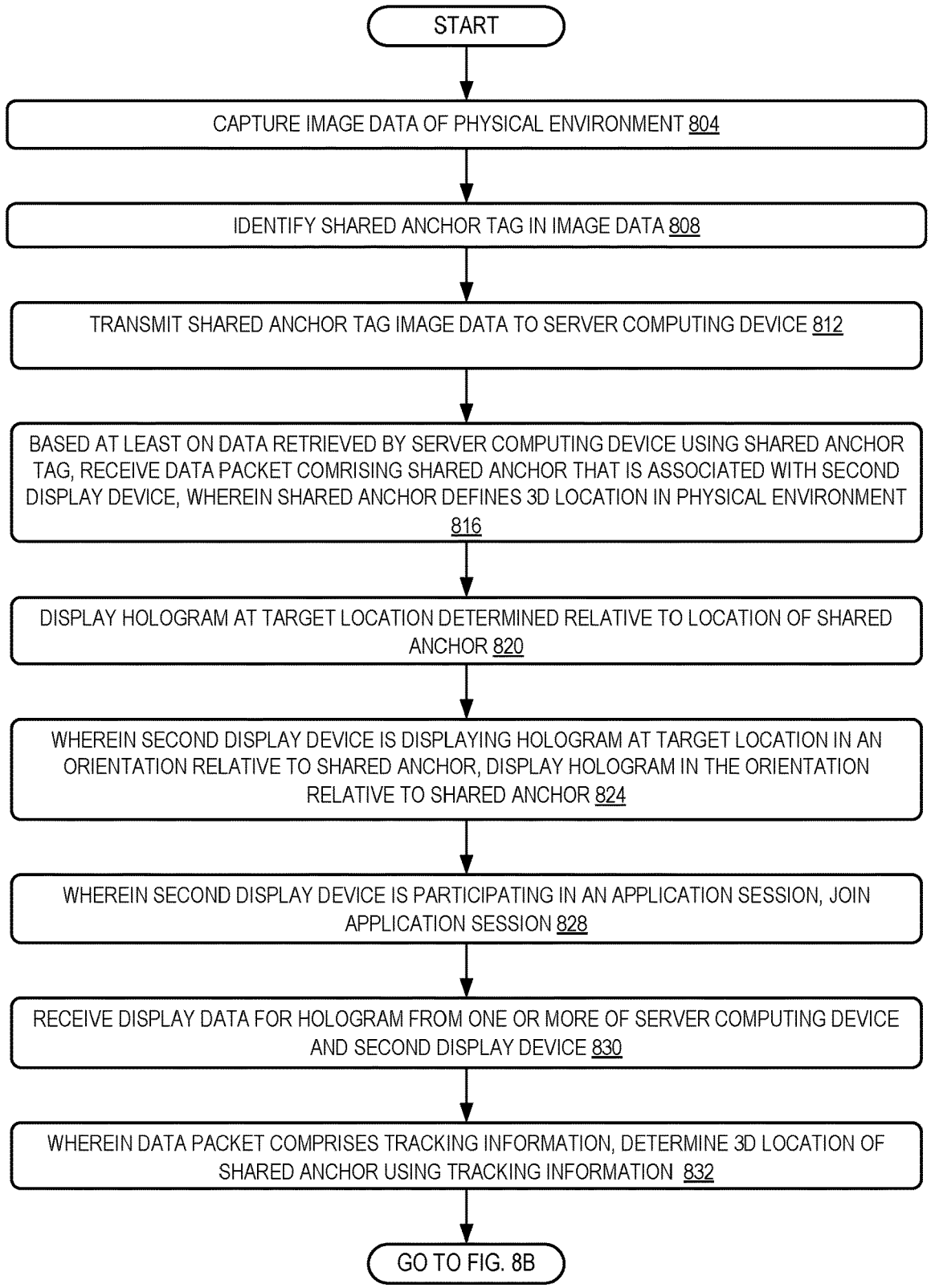

FIGS. 8A and 8B illustrate a flow chart of a method 800 for displaying a hologram relative to the location of a shared anchor according to examples of the present disclosure. The following description of method 800 is provided with reference to the software and hardware components described above and shown in FIGS. 1-7. It will be appreciated that method 800 also may be performed in other contexts using other suitable hardware and software components.

With reference to FIG. 8A, at 804 the method 800 may include capturing image data of a physical environment. At 808 the method 800 may include identifying a shared anchor tag in the image data. At 812 the method 800 may include transmitting the shared anchor tag image data to a server computing device. At 816 the method 800 may include, based at least on data retrieved by the server computing device using the shared anchor tag, receiving a data packet comprising a shared anchor that is associated with a second display device, wherein the shared anchor defines a three-dimensional location in the physical environment. At 820 the method 800 may include displaying a hologram at a target location that is determined relative to the location of the shared anchor.

At 824 the method 800 may include, wherein the second display device is displaying the hologram at the target location in an orientation relative to the shared anchor, displaying the hologram in the orientation relative to the shared anchor. At 828 the method 800 may include, wherein the second display device is participating in an application session, joining the application session. At 830 the method 800 may include receiving display data for the hologram from one or more of the server computing device and the second display device. At 832 the method 800 may include, wherein the data packet comprises tracking information, determining the three dimensional location of the shared anchor using the tracking information.

With reference now to FIG. 8B, at 836 the method 800 may include, wherein the second display device is displaying the hologram at another location in another physical environment that is outside a field of view of the first display device. At 840 the method 800 may include, wherein the first display device comprises a head-mounted display device comprising an at least partially see-through display. At 844 the method 800 may include, wherein the shared anchor tag is a first shared anchor tag, identifying a second shared anchor tag in the image data; and based at least on identifying the first shared anchor tag before identifying the second shared anchor tag, displaying the hologram at the target location determined relative to the location of the shared anchor.

At 848 the method 800 may include, wherein the shared anchor tag is a first shared anchor tag, the method further comprising: identifying a second shared anchor tag in the image data; and based at least on determining that the first shared anchor tag is closer to the first display device than the second shared anchor tag, displaying the hologram at the target location determined relative to the location of the shared anchor. At 852 the method 800 may include, wherein the shared anchor tag is a first shared anchor tag, identifying a second shared anchor tag in the image data; and displaying one or more conflict resolution indicators to enable selection of the first shared anchor tag or the second shared anchor tag.

It will be appreciated that method 800 is provided by way of example and is not meant to be limiting. Therefore, it is to be understood that method 800 may include additional and/or alternative steps relative to those illustrated in FIGS. 8A and 8B. Further, it is to be understood that method 800 may be performed in any suitable order. Further still, it is to be understood that one or more steps may be omitted from method 800 without departing from the scope of this disclosure.

In some embodiments, the methods and processes described herein may be tied to a computing system of one or more computing devices. Such methods and processes may be implemented as a computer-application program or service, an application-programming interface (API), a library, and/or other computer-program product.

While the above examples are described in the context of displaying holograms, it will be appreciated that the present disclosure may be utilized with other virtual content, such as two-dimensional images, and with non-holographic displays. For example, tablet computers, smartphones, and other mobile computing devices may receive a digital video feed that visually augments a user's view of a real world environment via a display according to the principles of the present disclosure.

Figure 9:
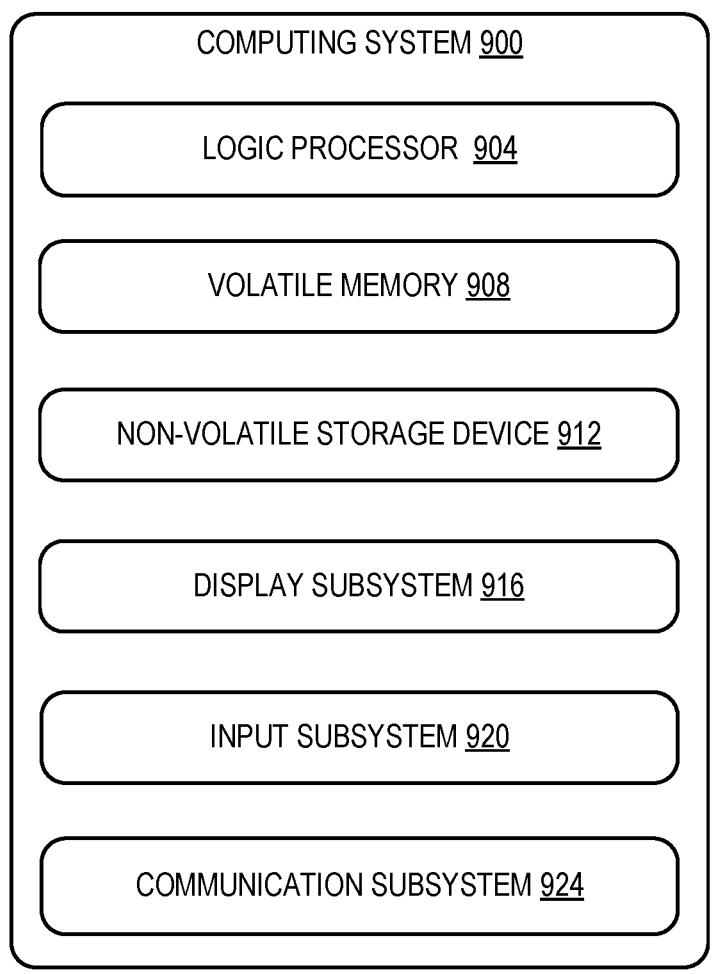
FIG. 9 shows a computing system according to an embodiment of the present description.

FIG. 9 schematically shows a non-limiting embodiment of a computing system 900 that can enact one or more of the methods and processes described above. Computing system 900 is shown in simplified form. Computing system 900 may take the form of one or more head-mounted display devices as shown in FIG. 1, or one or more devices cooperating with a head-mounted display device (e.g., personal computers, server computers, tablet computers, home-entertainment computers, network computing devices, gaming devices, mobile computing devices, mobile communication devices (e.g., smart phone), and/or other computing devices).

Computing system 900 includes a logic processor 904, volatile memory 908, and a non-volatile storage device 912. Computing system 900 may optionally include a display subsystem 916, input subsystem 920, communication subsystem 924, and/or other components not shown in FIG. 9.

Logic processor 904 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 904 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects may be run on different physical logic processors of various different machines.

Volatile memory 908 may include physical devices that include random access memory. Volatile memory 908 is typically utilized by logic processor 904 to temporarily store information during processing of software instructions. It will be appreciated that volatile memory 908 typically does not continue to store instructions when power is cut to the volatile memory 908.

Non-volatile storage device 912 includes one or more physical devices configured to hold instructions executable by the logic processors to implement the methods and processes described herein. When such methods and processes are implemented, the state of non-volatile storage device 912 may be transformed—e.g., to hold different data.

Non-volatile storage device 912 may include physical devices that are removable and/or built-in. Non-volatile storage device 912 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 912 may include nonvolatile, dynamic, static, read/write, read-only, sequential-access, location-addressable, file-addressable, and/or content-addressable devices. It will be appreciated that non-volatile storage device 912 is configured to hold instructions even when power is cut to the non-volatile storage device 912.

Aspects of logic processor 904, volatile memory 908, and non-volatile storage device 912 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 900 implemented to perform a particular function. In some cases, a program may be instantiated via logic processor 904 executing instructions held by non-volatile storage device 912, using portions of volatile memory 908. It will be understood that different programs may be instantiated from the same application, service, code block, object, library, routine, API, function, etc. Likewise, the same program may be instantiated by different applications, services, code blocks, objects, routines, APIs, functions, etc. The term "program" encompasses individual or groups of executable files, data files, libraries, drivers, scripts, database records, etc.

When included, display subsystem 916 may be used to present a visual representation of data held by non-volatile storage device 912. As the herein described methods and processes change the data held by the non-volatile storage device, and thus transform the state of the non-volatile storage device, the state of display subsystem 916 may likewise be transformed to visually represent changes in the underlying data. Display subsystem 916 may include one or more display devices utilizing virtually any type of technology. Such display devices may be combined with logic processor 904, volatile memory 908, and/or non-volatile storage device 912 in a shared enclosure, or such display devices may be peripheral display devices.

When included, input subsystem 920 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection, gaze detection, and/or intent recognition; as well as electric-field sensing componentry for assessing brain activity; any of the sensors described above with respect to position sensor system 42 of FIG. 1; and/or any other suitable sensor.

When included, communication subsystem 924 may be configured to communicatively couple computing system 900 with one or more other computing devices. Communication subsystem 924 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 900 to send and/or receive messages to and/or from other devices via a network such as the Internet.

The following paragraphs provide additional support for the claims of the subject application. One aspect provides, at a first display device, a method comprising capturing image data of a physical environment; identifying a shared anchor tag in the image data; transmitting the shared anchor tag image data to a server computing device; based at least on data retrieved by the server computing device using the shared anchor tag, receiving a data packet comprising a shared anchor that is associated with a second display device, wherein the shared anchor defines a three-dimensional location in the physical environment; and displaying a hologram at a target location that is determined relative to the location of the shared anchor. The method may additionally or optionally include, wherein the second display device is displaying the hologram at the target location in an orientation relative to the shared anchor, and wherein displaying the hologram further comprises displaying the hologram in the orientation relative to the shared anchor. The method may additionally or optionally include, wherein the second display device is participating in an application session: joining the application session; and receiving display data for the hologram from one or more of the server computing device and the second display device. The method may additionally or optionally include, wherein the data packet comprises tracking information, determining the three dimensional location of the shared anchor using the tracking information. The method may additionally or optionally include, wherein the second display device is displaying the hologram at another location in another physical environment that is outside a field of view of the first display device. The method may additionally or optionally include, wherein the first display device comprises a head-mounted display device comprising an at least partially see-through display. The method may additionally or optionally include, wherein the shared anchor tag is a first shared anchor tag: identifying a second shared anchor tag in the image data; and based at least on identifying the first shared anchor tag before identifying the second shared anchor tag, displaying the hologram at the target location determined relative to the location of the shared anchor. The method may additionally or optionally include, wherein the shared anchor tag is a first shared anchor tag: identifying a second shared anchor tag in the image data; and based at least on determining that the first shared anchor tag is closer to the first display device than the second shared anchor tag, displaying the hologram at the target location determined relative to the location of the shared anchor. The method may additionally or optionally include, wherein the shared anchor tag is a first shared anchor tag: identifying a second shared anchor tag in the image data; and displaying one or more conflict resolution indicators to enable selection of the first shared anchor tag or the second shared anchor tag.

Another aspect provides a computing device for computing device for displaying virtual content via a first display device, the computing device comprising: a processor; and a memory holding instructions executable by the processor to: capture image data of a physical environment; identify a shared anchor tag in the image data; transmit the shared anchor tag image data to a server computing device; based at least on data retrieved by the server computing device using the shared anchor tag, receive a data packet comprising a shared anchor that is associated with a second display device, wherein the shared anchor defines a three-dimensional location in the physical environment; and display a hologram at a target location that is determined relative to the location of the shared anchor. The computing device may additionally or alternatively include, wherein the second display device is displaying the hologram at the target location in an orientation relative to the shared anchor, and wherein the instructions are executable to display the hologram in the orientation relative to the shared anchor. The computing device may additionally or alternatively include, wherein the second display device is participating in an application session, and the instructions are executable to: join the application session; and receive display data for the hologram from one or more of the server computing device and the second display device. The computing device may additionally or alternatively include, wherein the data packet comprises tracking information, and the instructions are executable to determine the three-dimensional location of the shared anchor using the tracking information. The computing device may additionally or alternatively include, wherein the second display device is displaying the hologram at another location in another physical environment that is outside a field of view of the first display device. The computing device may additionally or alternatively include, wherein the first display device comprises a head-mounted display device comprising an at least partially see-through display. The computing device may additionally or alternatively include, wherein the shared anchor tag is a first shared anchor tag, and the instructions are executable to: identify a second shared anchor tag in the image data; and based at least on identifying the first shared anchor tag before identifying the second shared anchor tag, transmit the first shared anchor tag image data to the server computing device. The computing device may additionally or alternatively include, wherein the shared anchor tag is a first shared anchor tag, and the instructions are executable to: identify a second shared anchor tag in the image data; and based at least on determining that the first shared anchor tag is closer to the first display device than the second shared anchor tag, transmit the first shared anchor tag image data to the server computing device. The computing device may additionally or alternatively include, wherein the shared anchor tag is a first shared anchor tag, and the instructions are executable to: identify a second shared anchor tag in the image data; and display one or more conflict resolution indicators to enable selection of the first shared anchor tag or the second shared anchor tag.

Another aspect provides head-mounted display device, comprising: an at least partially see-through display; a processor; and a memory holding instructions executable by the processor to: capture image data of a physical environment; identify a shared anchor tag in the image data; transmit the shared anchor tag image data to a server computing device; based at least on data retrieved by the server computing device using the shared anchor tag, receive a data packet comprising a shared anchor that is associated with another display device, wherein the shared anchor defines a three-dimensional location in the physical environment and the other display device is displaying a hologram at a target location that is determined relative to the location of the shared anchor; and display the hologram at the target location. The head-mounted display device may additionally or alternatively include, wherein the other display device is participating in an application session, and the instructions are executable to: join the application session; and receive display data for the hologram from one or more of the server computing device and the second display device.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. At a first display device, a method comprising:
   capturing image data of a physical environment;
   identifying in the image data a first shared anchor tag comprising a first object located in the physical environment;
   identifying in the image data a second shared anchor tag comprising a second object located in the physical environment;
   transmitting the first shared anchor tag image data to a server computing device;
   receiving a data packet comprising a first shared anchor that is linked to the first shared anchor tag and associated with a second display device, wherein the first shared anchor defines a three-dimensional location in the physical environment, wherein the data packet comprises data retrieved by the server computing device using at least a portion of the first shared anchor tag image data;
   based on identifying the first shared anchor tag and the second shared anchor tag, displaying a first conflict resolution indicator at a first location that is associated with the first shared anchor tag and a second conflict resolution indicator at a second location that is associated with the second shared anchor tag;
   receiving a user input selecting the first conflict resolution indicator; and
   in response to receiving the user input, displaying a hologram at a target location corresponding to the selected first conflict resolution indicator.

2. The method of claim 1, wherein the second display device is displaying the hologram at the target location in an orientation relative to the first shared anchor, and wherein displaying the hologram further comprises displaying the hologram in the orientation relative to the first shared anchor.

3. The method of claim 2, wherein the second display device is participating in an application session, the method further comprising:
joining the application session; and
receiving display data for the hologram from one or more of the server computing device and the second display device.

4. The method of claim 1, wherein the data packet comprises tracking information, the method further comprising determining the three-dimensional location of the first shared anchor using the tracking information.

5. The method of claim 1, wherein the second display device is displaying the hologram at another location in another physical environment that is outside a field of view of the first display device.

6. The method of claim 1, wherein the first display device comprises a head-mounted display device comprising an at least partially see-through display.

7. A computing device for displaying virtual content via a first display device, the computing device comprising:
a processor; and
a memory holding instructions executable by the processor to:
capture image data of a physical environment;
identify in the image data a first shared anchor tag comprising a first object located in the physical environment;
identify in the image data a second shared anchor tag comprising a second object located in the physical environment
transmit the first shared anchor tag image data to a server computing device;
receive a data packet comprising a first shared anchor that is linked to the first shared anchor tag and associated with a second display device, wherein the first shared anchor defines a three-dimensional location in the physical environment, wherein the data packet comprises data retrieved by the server computing device using at least a portion of the first shared anchor tag image data;
based on identifying the first shared anchor tag and the second shared anchor tag, display a first conflict resolution indicator at a first location that is associated with the first shared anchor tag and a second conflict resolution indicator at a second location that is associated with the second shared anchor tag;
receive a user input selecting the first conflict resolution indicator; and
in response to receiving the user input, display a hologram at a target location corresponding to the selected first conflict resolution indicator.

8. The computing device of claim 7, wherein the second display device is displaying the hologram at the target location in an orientation relative to the first shared anchor, and wherein the instructions are executable to display the hologram in the orientation relative to the first shared anchor.

9. The computing device of claim 8, wherein the second display device is participating in an application session, and the instructions are executable to:
join the application session; and
receive display data for the hologram from one or more of the server computing device and the second display device.

10. The computing device of claim 7, wherein the data packet comprises tracking information, and the instructions are executable to determine the three-dimensional location of the first shared anchor using the tracking information.

11. The computing device of claim 7, wherein the second display device is displaying the hologram at another location in another physical environment that is outside a field of view of the first display device.

12. The computing device of claim 7, wherein the first display device comprises a head-mounted display device comprising an at least partially see-through display.

13. The computing device of claim 7, wherein the instructions are executable to:
based at least on identifying the first shared anchor tag before identifying the second shared anchor tag, transmit the first shared anchor tag image data to the server computing device.

14. A head-mounted display device, comprising:
an at least partially see-through display;
a processor; and
a memory holding instructions executable by the processor to:
capture image data of a physical environment;
identify in the image data a first shared anchor tag comprising a first object located in the physical environment;
identify in the image data a second shared anchor tag comprising a second object located in the physical environment;
transmit the first shared anchor tag image data to a server computing device;
receive a data packet comprising a first shared anchor that is linked to the first shared anchor tag and associated with another display device, wherein the first shared anchor defines a three-dimensional location in the physical environment and the other display device is displaying a hologram at a target location that is determined relative to the location of the first shared anchor, wherein the data packet comprises data retrieved by the server computing device using at least a portion of the first shared anchor tag image data;
based on identifying the first shared anchor tag and the second shared anchor tag, display a first conflict resolution indicator at a first location that is associated with the first shared anchor tag and a second conflict resolution indicator at a second location that is associated with the second shared anchor tag;
receive a user input selecting the first conflict resolution indicator; and
in response to receiving the user input, display the hologram at a location corresponding to the selected first conflict resolution indicator.

15. The head-mounted display device of claim 14, wherein the other display device is participating in an application session, and the instructions are executable to:
join the application session; and
receive display data for the hologram from one or more of the server computing device and the other display device.

* * * * *